(12) United States Patent
Shimizu et al.

(10) Patent No.: US 11,431,489 B2
(45) Date of Patent: Aug. 30, 2022

(54) ENCRYPTION PROCESSING SYSTEM AND ENCRYPTION PROCESSING METHOD

(71) Applicant: FUJITSU LIMITED, Kawasaki (JP)

(72) Inventors: Toshiya Shimizu, Kawasaki (JP); Takeshi Shimoyama, Shinagawa (JP); Goichiro Hanaoka, Koto (JP); Yusuke Sakai, Koto (JP); Seonghan Shin, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 17/081,491

(22) Filed: Oct. 27, 2020

(65) Prior Publication Data

US 2021/0135851 A1 May 6, 2021

(30) Foreign Application Priority Data

Nov. 1, 2019 (JP) .............................. JP2019-199804

(51) Int. Cl.
*H04L 9/08* (2006.01)
*H04L 9/32* (2006.01)

(52) U.S. Cl.
CPC ............ *H04L 9/085* (2013.01); *H04L 9/0825* (2013.01); *H04L 9/0866* (2013.01); *H04L 9/0869* (2013.01); *H04L 9/3247* (2013.01)

(58) Field of Classification Search
None
See application file for complete search history.

(56) References Cited

U.S. PATENT DOCUMENTS 6,026,163 A 2/2000 Micali
9,049,011 B1 * 6/2015 Agrawal .............. H04L 9/0894
(Continued)

FOREIGN PATENT DOCUMENTS

JP 2004-048336 A 2/2004
JP 2016-151797 A 8/2016
WO WO-2017163109 A1 * 9/2017 ........... H04L 9/0822

OTHER PUBLICATIONS

Aris J. Ordonez et al.,"Modified El Gamal Algorithm for Multiple Senders and Single Receiver Encryption", 2018 IEEE Symposium on Computer Applications & Industrial Electronics (ISCAIE), Apr. 28, 2018, pp. 201-205, XP033372002, [retrieved on Jul. 5, 2018] Cited in EESR dated Mar. 18, 2021 corresponding to European Patent Application No. 20201995.6.
(Continued)

*Primary Examiner* — Benjamin E Lanier
(74) *Attorney, Agent, or Firm* — Fujitsu Patent Center (57) ABSTRACT

An encryption processing system includes: a first device; second devices; and a third device, wherein the first device generates synthesis keys by selecting public keys of the second devices; generates an intermediate text from confidential texts generated by encrypting secret information by using public keys of the second devices having decryption authority; generates ciphertexts by further encrypting the intermediate text using the synthesis keys; and makes public the ciphertexts, each of the second devices verifies validity of the ciphertexts; generates decryption key fragments by using an own private key; and makes public the decryption key fragments, the third device verifies validity of the decryption key fragments; generates a decryption key by combining decryption key fragments; generates the Intermediate text by decrypting one of the ciphertexts; and makes public the intermediate text, and the second device decrypts the intermediate text using the own private key; and restores the secret information.

11 Claims, 9 Drawing Sheets

(56) References Cited

U.S. PATENT DOCUMENTS

| | | | |
|---|---|---|---|
| 10,374,794 B1* | 8/2019 | Peddada | H04L 9/0825 |
| 2012/0243687 A1* | 9/2012 | Li | H04L 9/085 |
| | | | 380/277 |
| 2013/0039491 A1* | 2/2013 | Unagami | G06F 21/575 |
| | | | 380/44 |
| 2020/0082113 A1* | 3/2020 | Van Liesdonk | G06Q 10/087 |
| 2021/0049600 A1* | 2/2021 | Spector | G06Q 20/389 |

OTHER PUBLICATIONS

Boyang Wang et al., "A Tale of Two Clouds: Computing on Data Encrypted under Multiple Keys", 2014 IEEE Conference on Communications and Network Security, Oct. 29, 2014, pp. 337-345, XP032714698, [retrieved on Dec. 23, 2014] Cited in EESR dated Mar. 18, 2021 corresponding to European Patent Application No. 20201995.6.

EESR—Extended European Search Report dated Mar. 18, 2021 from corresponding European Patent Application No. 20201995.6.

* cited by examiner

ENCRYPTION PROCESSING SYSTEM AND ENCRYPTION PROCESSING METHOD

CROSS-REFERENCE TO RELATED APPLICATION

This application is based upon and claims the benefit of priority of the prior Japanese Patent Application No. 2019-199804, filed on Nov. 1, 2019, the entire contents of which are incorporated herein by reference.

FIELD

The embodiments discussed herein are related to an encryption processing system and an encryption processing method.

BACKGROUND

Figure 9:
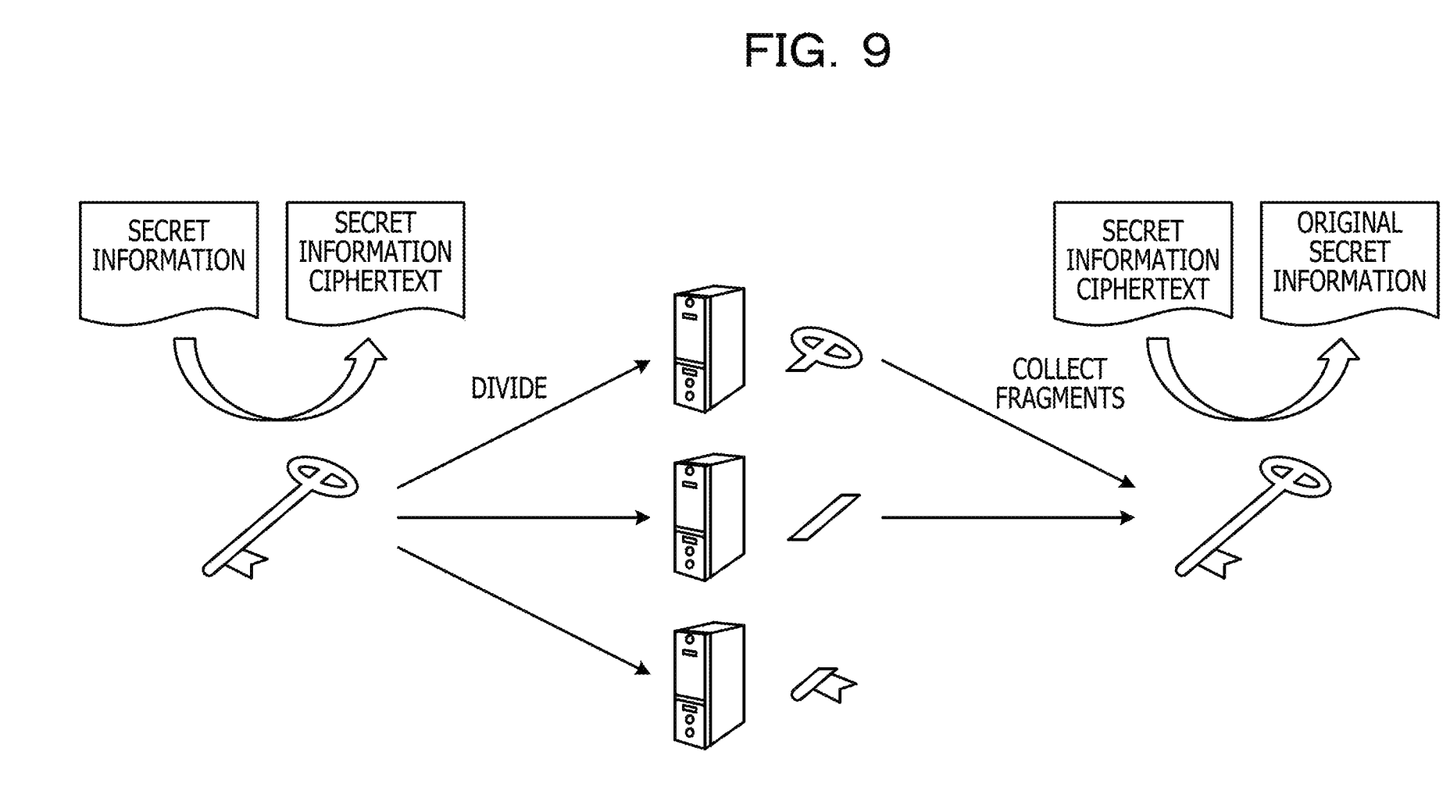
FIG. 9 is a diagram for explaining encapsulation.

As a technique for managing secret information, there is a secret sharing technique of sharing and managing secret information. In the secret sharing technique, for example, when it is desired to reduce the amount of data to be shared and managed, encapsulation is performed. FIG. 9 is a diagram for explaining encapsulation. As illustrated in FIG. 9, in encapsulation, secret information is encrypted with a common key, and the common key is divided into fragments and managed. Upon decryption, the fragments are collected to restore the common key and the original secret information is decrypted.

As a technique of related art, there is a technique of reducing a risk caused by leakage of stored secret information and leakage of transmitted secret information. In this technique, a personal information service server divides secret information into a plurality of pieces of shared data, causes a storage server to store the shared data, and when receiving a request from a user application server, acquires the plurality of pieces of shared data from the storage server to restore the secret information. The personal Information service server encrypts the restored secret information, divides the secret information into a plurality of pieces of shared data corresponding to the number of communication paths, and transmits the plurality of divided pieces of shared data through the plurality of communication paths, respectively.

There is also a technique in which, when first encrypted data stored in a data storage unit is transmitted to another mutually authenticated device, the first encrypted data is decrypted, the decrypted data is encrypted into second encrypted data corresponding to a transmission destination, and the second encrypted data is transmitted, thereby enabling transmission and reception of highly confidential data.

Related techniques are disclosed in, for example, Japanese Laid-open Patent Publication No. 2016-151797 and Japanese Laid-open Patent Publication No. 2004-48336.

SUMMARY

According to an aspect of the embodiments, an encryption processing system includes: a first device configured to encrypt secret information; second devices of a first number, the second devices each including a key pair of a public key and a private key; and a third device configured to collect and combine pieces of fragment information shared by the second devices of the first number, wherein the first device includes: a first memory; and a first processor coupled to the first memory and the first processor configured to: generate synthesis keys of a third number by performing, a third number of times, a process for selecting public keys of a second number to be used for key restoration from public keys of the first number to generate the synthesis key, the third number being a number of combinations of selecting the public keys of the second number from the public keys of the first number; generate an intermediate text from confidential texts of a fourth number generated by encrypting each piece of the secret information by using the public keys of the second devices of the fourth number having decryption authority for the secret information among the second devices of the first number, and generates secret information ciphertexts of the third number by further encrypting the intermediate text using each of the synthesis keys; and make public encrypted data Including the secret information ciphertexts of the third number and a first signature relating to the secret information ciphertexts of the third number, each of the second devices includes: a second memory; and a second processor coupled to the second memory and the second processor configured to: verify validity of the encrypted data by using the first signature; generate, when the validity has been verified, by using a private key included in an own second device, decryption key fragments of a fifth number, the fifth number being a number of combinations of selecting the second devices of a number obtained by subtracting one from the second number from among the second devices of a number obtained by subtracting one from the first number; generate second signatures of the fifth number respectively corresponding to the decryption key fragments of the fifth number; and make public the decryption key fragments of the fifth number and the corresponding second signatures, the third device includes: a third memory; and a third processor coupled to the third memory and the third processor configured to: verify validity of the decryption key fragments of the fifth number by using the decryption key fragments of the fifth number and the corresponding second signatures; generate a decryption key by combining decryption key fragments of the second number corresponding to any one of the secret information ciphertexts of the third number among the decryption key fragments of the fifth number that are made public by each of the second devices of the first number, and generates the intermediate text by decrypting the secret information ciphertext corresponding to the generated decryption key with the generated decryption key; and make public the intermediate text generated by the third processor, and the second processor is further configured to: decrypt, when the own second device has the decryption authority, the intermediate text that is made public by the third processor using the private key included in the own second device; and restore the secret information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The encapsulation illustrated in FIG. 9 has a problem in which a highly reliable organization that generates a common key has to be used because the secret information is restored when the common key is illegally acquired.

Hereinafter, embodiments disclosed in the present application will be described in detail with reference to the drawings. The embodiments do not limit the techniques disclosed herein.

First Embodiment

Figure 1:
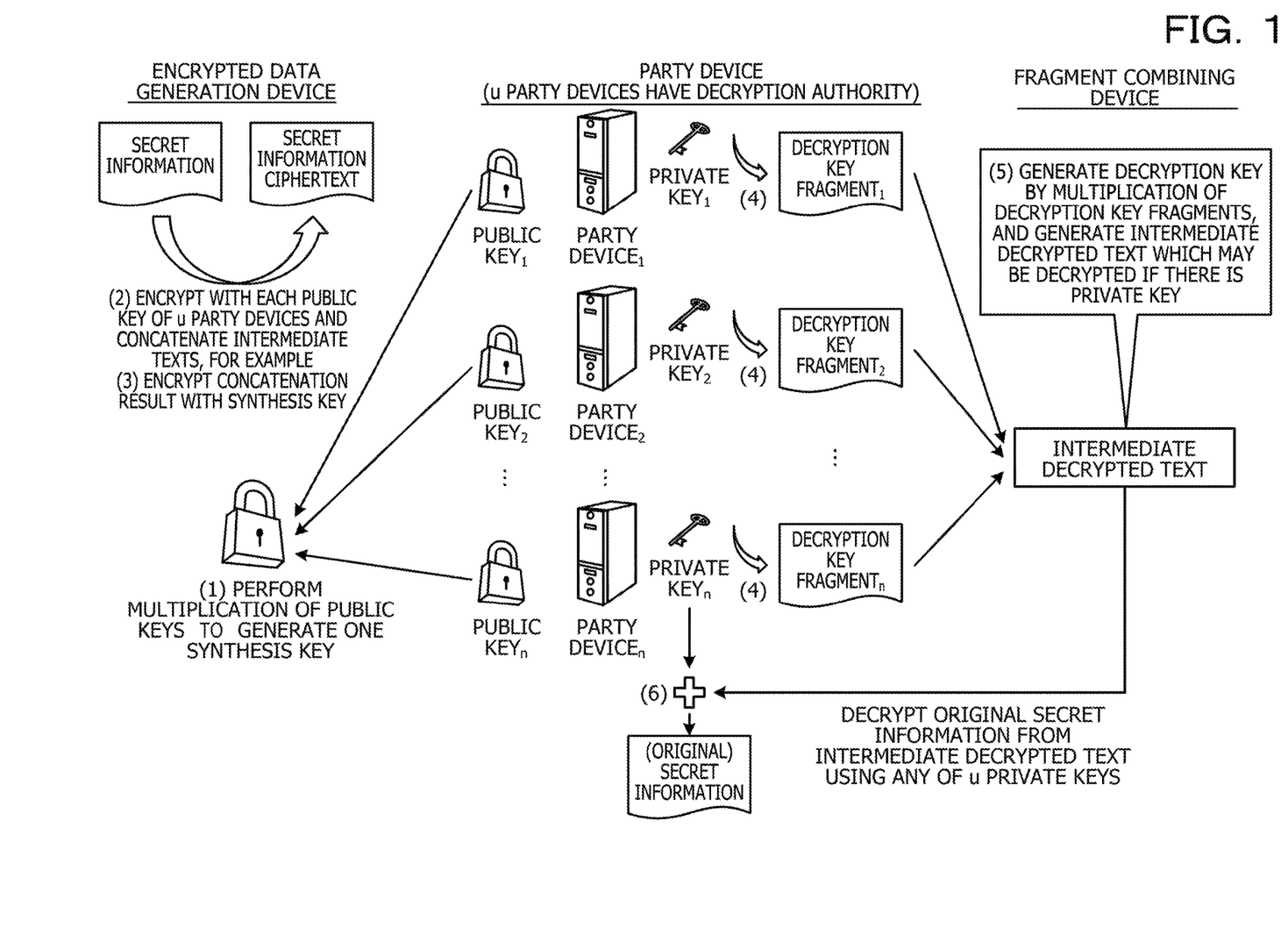
FIG. 1 is a diagram for explaining encryption and decryption by an encryption processing system according to a first embodiment.

First, encryption and decryption by an encryption processing system according to a first embodiment will be described. FIG. 1 is a diagram for explaining encryption and decryption by the encryption processing system according to the first embodiment. In FIG. 1, an encrypted data generation device encrypts secret information. Each of n (n is a positive integer) party devices Includes a key pair of a public key and a private key. Of the n party devices, u ($1 \leq u \leq n$) party devices have authority to restore the secret information.

For example, the encrypted data generation device is a device used by a creator who creates a will, and the party device is a device used by a party who is related to the will and other than the creator. n-1 party devices are used by respective successors and one party device is used by a lawyer. A fragment combining device collects and combines pieces of fragment information shared by the party devices.

The encrypted data generation device, each party device, and the fragment combining device are coupled to a network (hereinafter, referred to as a public network) capable of making public and sharing information, such as a blockchain. The public key owned by each party device is made public through the public network.

As illustrated in FIG. 1, the encrypted data generation device acquires, through the public network, a public $key_1$, a public $key_2$, ..., and a public $key_n$ respectively owned by a party $device_1$, a party $device_2$, ..., and a party $device_n$, and generates a synthesis key by multiplication of the acquired public keys (1). The encrypted data generation device encrypts the secret information with each public key of the u party devices having authority to restore the secret information and generates u intermediate texts and concatenates the u intermediate texts, for example (2). The encrypted data generation device generates a secret Information ciphertext by encrypting the concatenated u intermediate texts with the synthesis key and makes the secret information ciphertext public through the public network (3).

A party $device_i$ (i=1, 2, ..., n) generates a decryption key fragment from a private $key_i$, and makes the decryption key fragment public through the public network (4). The fragment combining device acquires n decryption key fragments, generates a decryption key by multiplication of the acquired n decryption key fragments, generates an intermediate decrypted text, which may be decrypted if there is a private key, by using the generated decryption key, and makes the intermediate decrypted text public through the public network (5). The party device having the authority to restore the secret information decrypts the intermediate decrypted text using the private $key_i$ to restore the secret information (6).

In this manner, the encrypted data generation device performs multiplication of public keys to generate a synthesis key. The encrypted data generation device encrypts secret information with the public keys of the party devices having the authority to decrypt the secret information, then generates a secret information ciphertext by encryption with the synthesis key, and makes the secret information ciphertext public. Each party device generates a decryption key fragment by using a private key and makes the decryption key fragment public. The fragment combining device generates a decryption key by multiplication of the decryption key fragments, generates an intermediate decrypted text using the decryption key, and makes the intermediate decrypted text public. The party device having the decryption authority decrypts the intermediate decrypted text by using the private key to restore the secret information. Therefore, the encryption processing system according to the first embodiment enables non-use of a highly reliable organization that generates a common key.

Figure 2:
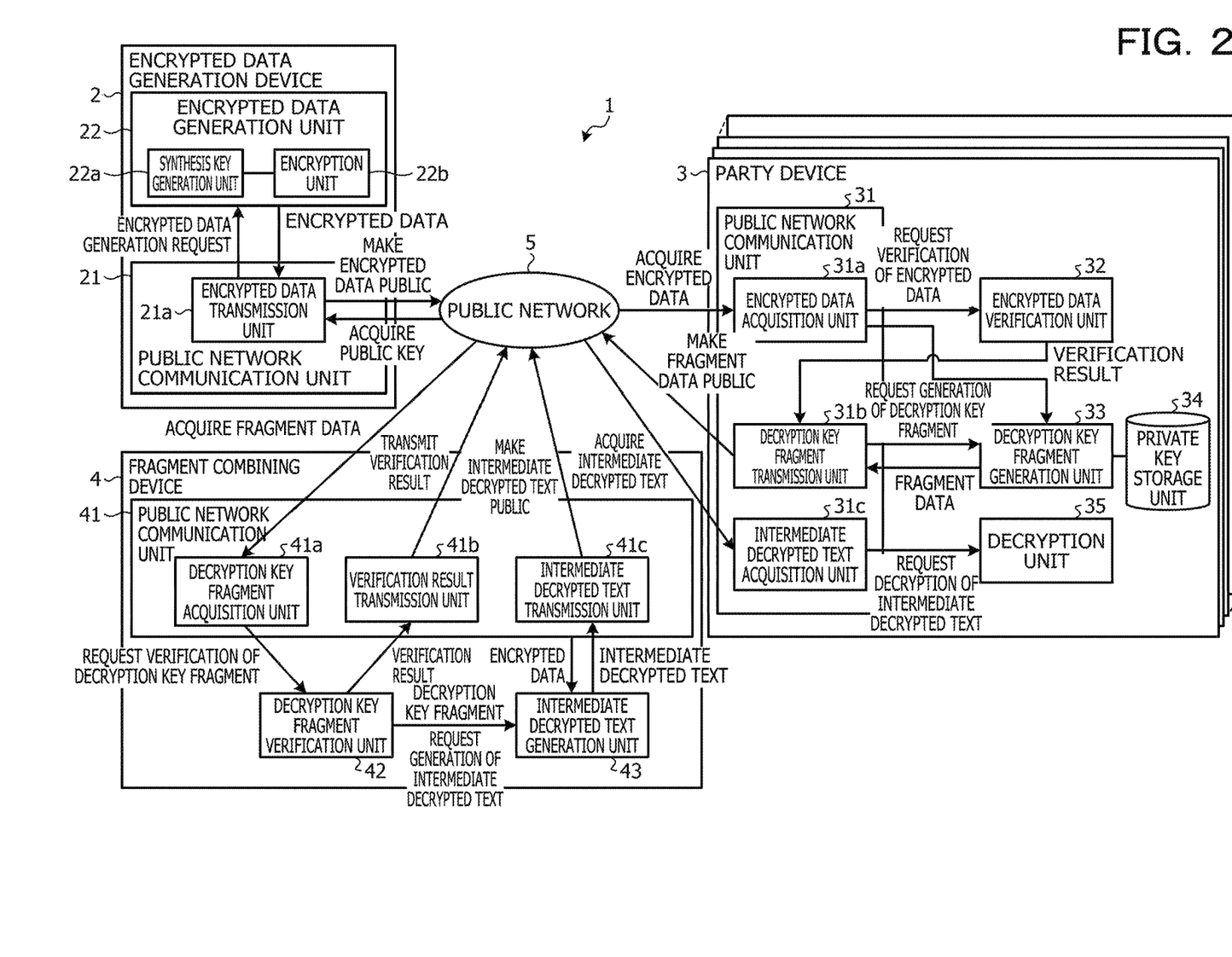
FIG. 2 is a diagram illustrating a configuration of the encryption processing system according to the first embodiment.

Next, a configuration of the encryption processing system according to the first embodiment will be described. FIG. 2 is a diagram illustrating the configuration of the encryption processing system according to the first embodiment. As illustrated in FIG. 2, an encryption processing system 1 includes an encrypted data generation device 2, n party devices 3, and a fragment combining device 4. The encrypted data generation device 2, the n party devices 3, and the fragment combining device 4 are coupled to a public network 5.

The encrypted data generation device 2 is a device used by an encrypted data generator to encrypt secret information. The encrypted data generation device 2 includes a public network communication unit 21 and an encrypted data generation unit 22. The public network communication unit 21 acquires information made public through the public network 5. The public network communication unit 21 makes information public through the public network 5. The public network communication unit 21 includes an encrypted data transmission unit 21a.

The encrypted data transmission unit 21a is an example of a first public unit, acquires public keys made public through the public network 5, and passes the acquired public keys to the encrypted data generation unit 22 together with an encrypted data generation request. The encrypted data transmission unit 21a receives the encrypted data from the encrypted data generation unit 22 and makes the encrypted data public through the public network 5.

The encrypted data generation unit 22 generates a synthesis key, which is used for encryption of secret information, by using the public keys, and encrypts the secret information by using the public keys of the party devices 3 having decryption authority and the synthesis key to generate a secret information ciphertext. The encrypted data generation unit 22 generates encrypted data including the secret information ciphertext and passes the encrypted data to the encrypted data transmission unit 21a. The encrypted data generation unit 22 includes a synthesis key generation unit 22a and an encryption unit 22b.

The synthesis key generation unit 22a is an example of a first generation unit, and performs multiplication of the public keys of all of the party devices 3. The synthesis key generation unit 22a generates a random number. The synthesis key generation unit 22a generates one synthesis key by exponentiating the multiplication result of the public keys by the generated random number. The reason for exponentiation with a random number is to suppress the synthesis key generated from the public keys from normally being the same. The synthesis key generation unit 22a may convert the generated synthesis key into a fixed-length synthesis key using a hash function.

The encryption unit 22b is an example of a second generation unit, and generates u intermediate texts by encrypting secret information using each of the public keys owned by the u party devices 3 having the authority to decrypt the secret information. The encryption unit 22b concatenates the u intermediate texts and encrypts the concatenated intermediate texts with a synthesis key to generate a secret information ciphertext. The encryption unit 22b may encrypt each of the u intermediate texts with the synthesis key without concatenating the u intermediate texts to generate u secret information ciphertexts.

The encryption unit 22b generates a ciphertext signature for verifying whether or not encryption has been correctly performed using the public keys. The encryption unit 22b generates encrypted data including the secret information ciphertext, the ciphertext signature, and random number information, and passes the encrypted data to the encrypted data transmission unit 21a.

For example, in generating a key pair, it is assumed that a cyclic group G and a generator g thereof are fixed, and a key pair is generated using G and g as follows: a private key sk is an element of G, and a public key $pk=g^{sk}$. This framework is a general framework used in elliptic curve cryptography and the like. It is assumed that a key pair owned by each party device, is $(pk_i, sk_i)$, and pp (public parameter)=(G, g).

For example, when elliptic curve cryptography is used, $pp=p\|a\|b\|g_x\|g_y$. p, a, and b are respectively a prime number p, an integer a, and an integer b that define an elliptic curve $y^2=x^3+ax+b \pmod{p}$. $g_x$ and $g_y$ are respectively an x coordinate and a y coordinate of the generator g of the cyclic group formed by the points of the elliptic curve. ∥ represents concatenation.

Three different cryptographic hash functions $H_1$, $H_2$, and $H_3$ are also shared through the public network. These hash functions may be, for example, $H_j(m)=SHA256(j\|m)$ or the like, using SHA256 or the like, which is one of the hash functions.

It is also assumed that one common key encryption protocol is shared through the public network, and encryption of a message M by a key K and decryption of a ciphertext C by the key K are represented by E(K, M) and D(K, C), respectively. The common key encryption protocol is, for example, an Advanced Encryption Standard (AES), which is one way of common key encryption, and a cipher block chaining (CBC) mode, which is an encryption use mode of the AES.

In this case, the encryption unit 22b generates the following $c_1$ to $c_3$, c, and σ, generates encrypted data including $c_1$ to $c_3$, c, and σ, and passes the encrypted data to the encrypted data transmission unit 21a.

$$c_1=g^t \quad (1)$$

$$c_2=H_1(pp)^t \quad (2)$$

$$c_3=E((\Pi_{i=1}^n pk_1)^t, m) \quad (3)$$

$$P_1=g^\rho, P_2=H_1(pp)^\rho, c=H_2(pp\|pk_1\| \ldots \\ \|pk_n\|c_1\|c_2\|c_3\|P_1\|P_2) \quad (4)$$

$$\sigma=\rho+c*t \quad (5)$$

t, which is an element of G, is a random number generated by the synthesis key generation unit 22a to generate a synthesis key. $c_1$ is made public instead of t so that t may not be identified. ρ, which is an element of G, is a random number generated by the encryption unit 22b to generate a ciphertext signature. Assuming that u=2, namely, the number of the party devices 3 having decryption authority is two, m is a concatenation of two intermediate texts obtained by encrypting secret information with $pk_1$ and $pk_2$, respectively. $c_3$ is a secret information ciphertext, and $c_1$ and $c_2$ are pieces of random number information.

For example, the encryption unit 22b reads secret information from a file and encrypts the secret information. The file to be read and the information of the party device 3 having decryption authority are input, for example, by the encrypted data generator using a keyboard, a mouse, or the like.

The party device 3 is a device used by a party related to the secret Information. The party device 3 includes a public network communication unit 31, an encrypted data verification unit 32, a decryption key fragment generation unit 33, a private key storage unit 34, and a decryption unit 35.

The public network communication unit 31 acquires information made public through the public network 5. The public network communication unit 31 makes information public through the public network 5. The public network communication unit 31 includes an encrypted data acquisition unit 31a, a decryption key fragment transmission unit 31b, and an intermediate decrypted text acquisition unit 31c.

The encrypted data acquisition unit 31a acquires the encrypted data made public through the public network 5, and passes the encrypted data to the encrypted data verification unit 32 to request verification of the encrypted data.

The decryption key fragment transmission unit 31b is an example of a second public unit, receives the verification result of the encrypted data from the encrypted data verification unit 32, and requests the decryption key fragment generation unit 33 to generate a decryption key fragment when the validity of the encrypted data is verified. The decryption key fragment transmission unit 31b receives the fragment data generated by the decryption key fragment generation unit 33 and makes the fragment data public through the public network 5.

The intermediate decrypted text acquisition unit 31c acquires an intermediate decrypted text made public through the public network 5, and passes the acquired intermediate decrypted text to the decryption unit 35 together with a decryption request.

The encrypted data verification unit 32 is an example of a first verification unit, and verifies the encrypted data using the information on the ciphertext signature and the random number information included in the encrypted data. For example, the encrypted data verification unit 32 verifies the encrypted data depending on whether or not the following Formula (6) is established for c in Formula (4).

$$c = H_2(pp\|pk_1\| \ldots \|pk_n\|c_1\|c_2\|c_3\|(g^{\sigma*}c_1^{-c})\| \\ (H_1(pp)^{\sigma*}c_2^{-c})) \qquad (6)$$

In Formula (6), $$g^{\sigma*}c_1^{-c} = g^{p+ct}*g^{-ct} = h^p = P^1 \qquad (7)$$

$$H_1(pp)^{\sigma*}c_2^{-c} = H_1(pp)^{p+ct}*H_1(pp)^{-ct} = H_1(pp)^p = P_2 \qquad (8)$$

Therefore, Formula (6) represents that c is calculated from $c_1$ to $c_3$, c, and $\sigma$, each of which has been made public, to determine whether or not the calculated c is equal to the c which has been made public.

The decryption key fragment generation unit 33 is an example of a third generation unit, and generates a decryption key fragment using the private key of the own device and the random number information included in the encrypted data. The decryption key fragment generation unit 33 generates, using a random number, a fragment signature for verifying whether or not the generated decryption key fragment has been correctly generated by the party device 3. The decryption key fragment generation unit 33 generates fragment data including information on the decryption key fragment and the fragment signature, and passes the generated fragment data to the decryption key fragment transmission unit 31*b*.

For example, the decryption key fragment generation unit 33 generates a random number r, which is an element of G, used for the fragment signature, and then generates the following $K_i$, $d_i$, $s_i$ and passes the $K_i$, $d_i$, $s_i$ to the decryption key fragment transmission unit 31*b* as fragment data. $K_i$ is a decryption key fragment generated by the party device$_i$, and $d_i$ and $s_i$ are information on the fragment signature.

$$K_i = c_1^{sk_i} \qquad (9)$$

$$R_1 = g^r, R_2 = c_1^r, d_i = H_3(pp\|pk_1\| \ldots \\ \|pk_n\|c_1\|c_2\|c_3\|c\|\sigma\|pk_iK\|R_1\|R_2) \qquad (10)$$

$$s_i = r + d_i * sk_i \qquad (11)$$

The private key storage unit 34 stores a private key. The private key storage unit 34 is, for example, a file on a disk device, and the decryption key fragment generation unit 33 reads a private key from the file and generates a decryption key fragment.

The decryption unit 35 decrypts the intermediate decrypted text received from the intermediate decrypted text acquisition unit 31*c* using the private key of the own device, and restores the original secret information. However, only the decryption unit 35 of the party device 3 having decryption authority decrypts the intermediate decrypted text.

The fragment combining device 4 collects decryption key fragments to generate a decryption key, and decrypts a secret information ciphertext using the decryption key to generate an intermediate decrypted text. The fragment combining device 4 makes the intermediate decrypted text public. The fragment combining device 4 includes a public network communication unit 41, a decryption key fragment verification unit 42, and an intermediate decrypted text generation unit 43.

The public network communication unit 41 acquires information made public through the public network 5. The public network communication unit 41 makes information public through the public network 5. The public network communication unit 41 includes a decryption key fragment acquisition unit 41*a*, a verification result transmission unit 41*b*, and an intermediate decrypted text transmission unit 41*c*.

The decryption key fragment acquisition unit 41*a* acquires fragment data made public through the public network 5, and passes the fragment data to the decryption key fragment verification unit 42 to request verification of the decryption key fragment.

The verification result transmission unit 41*b* receives the verification result of the decryption key fragment from the decryption key fragment verification unit 42, and makes information on the decryption key fragment for which the verification result is not correct public through the public network 5.

The intermediate decrypted text transmission unit 41*c* is an example of a third public unit, and receives the intermediate decrypted text generated by the intermediate decrypted text generation unit 43 and makes the intermediate decrypted text public through the public network 5.

The decryption key fragment verification unit 42 is an example of a second verification unit, and verifies whether or not the decryption key fragment of the party device 3 is generated by the private key of the same party device 3 for all of the decryption key fragments by using the fragment signature included in the fragment data. For example, the decryption key fragment verification unit 42 verifies the decryption key fragment depending on whether or not the following Formula (12) is established for $d_i$ in Formula (10).

$$d_i = H_3(pp\|pk_1\| \ldots \|pk_n\|c_1\|c_2\|c_3\|\sigma\|pk_i\|K_i\|(g^{s_i*}pk_i^{-d_i})\| \\ (c_1^{s_i*}K_i^{-d_i}) \qquad (12)$$

In Formula (12), $$g^{s_i*}pk_i^{-d_i} = g^{r+d_i*sk_i} = g^r = R_1 \qquad (13)$$

$$c_1^{s_i*}K_i^{d_i} = c_1^{r+d1*sk_i} = c_1^r = R_2 \qquad (14)$$

Therefore, Formula (12) represents that d, is calculated from $c_1$ to $c_3$, c, $\sigma$, $K_i$, $d_i$, and $s_i$, each of which has been made public, to determine whether or not the calculated d, is equal to the d, which has been made public.

The decryption key fragment verification unit 42 passes the verification result to the verification result transmission unit 41*b*. Upon verifying that all of the decryption key fragments are correct, the decryption key fragment verification unit 42 requests the intermediate decrypted text generation unit 43 to generate an intermediate decrypted text. The decryption key fragment verification unit 42 may be included in a device other than the fragment combining device 4, including the encrypted data generation device 2 and the party device 3 other than the party device 3 that has generated the fragment signature.

The intermediate decrypted text generation unit 43 is an example of a fourth generation unit, generates a decryption key by multiplication of all decryption key fragments, and generates an intermediate decrypted text by decrypting the secret information ciphertext using the generated decryption key. The intermediate decrypted text generation unit 43 passes the generated intermediate decrypted text to the intermediate decrypted text transmission unit 41*c*. For example, the intermediate decrypted text generation unit 43 generates an intermediate decrypted text by performing the calculation of Formula (15) using $K_i$ and $c_3$.

$$D(\Pi_{i=1}^n K_i, c_3) \qquad (15)$$

Figure 3:
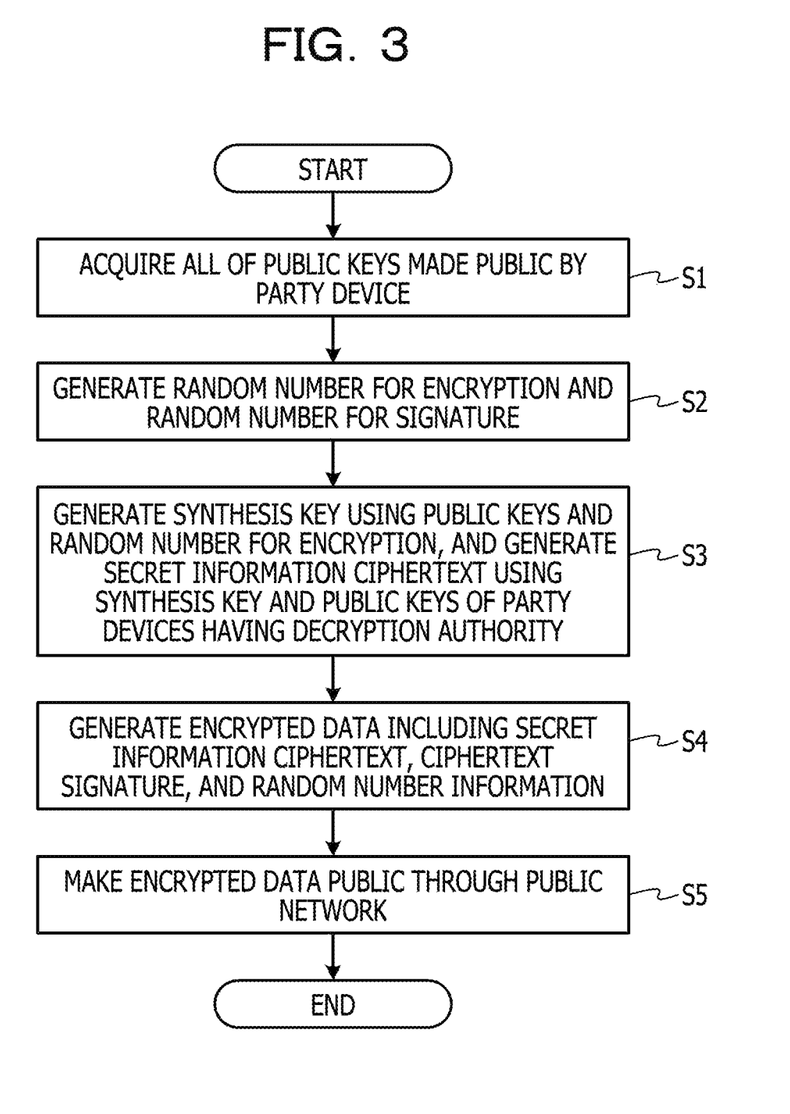
FIG. 3 is a flowchart illustrating a flow of processing by an encrypted data generation device.

Next, a flow of processing by the encrypted data generation device 2 will be described. FIG. 3 is a flowchart illustrating a flow of processing by the encrypted data generation device 2. As illustrated in FIG. 3, the encrypted data generation device 2 acquires all of public keys made public by the party device 3 (step S1). The encrypted data generation device 2 generates a random number for encryption and a random number for signature (step S2). The random number for encryption is a random number used for generation of a synthesis key, and the random number for signature is a random number used for a ciphertext signature for verifying that secret Information has been correctly encrypted using the public keys.

The encrypted data generation device 2 generates a synthesis key using the public keys and the random number for encryption, and generates a secret information ciphertext using the synthesis key and the public keys of the party devices 3 having decryption authority (step S3). The encrypted data generation device 2 generates a ciphertext signature using the random number for signature, and generates encrypted data including the secret information ciphertext, the ciphertext signature, and random number Information (step S4). The encrypted data generation device 2 makes the encrypted data public through the public network 5 (step S5).

As described above, since the encrypted data generation device 2 makes the encrypted data public through the public network 5, the fragment combining device 4 may generate an intermediate decrypted text using the encrypted data.

Figure 4:
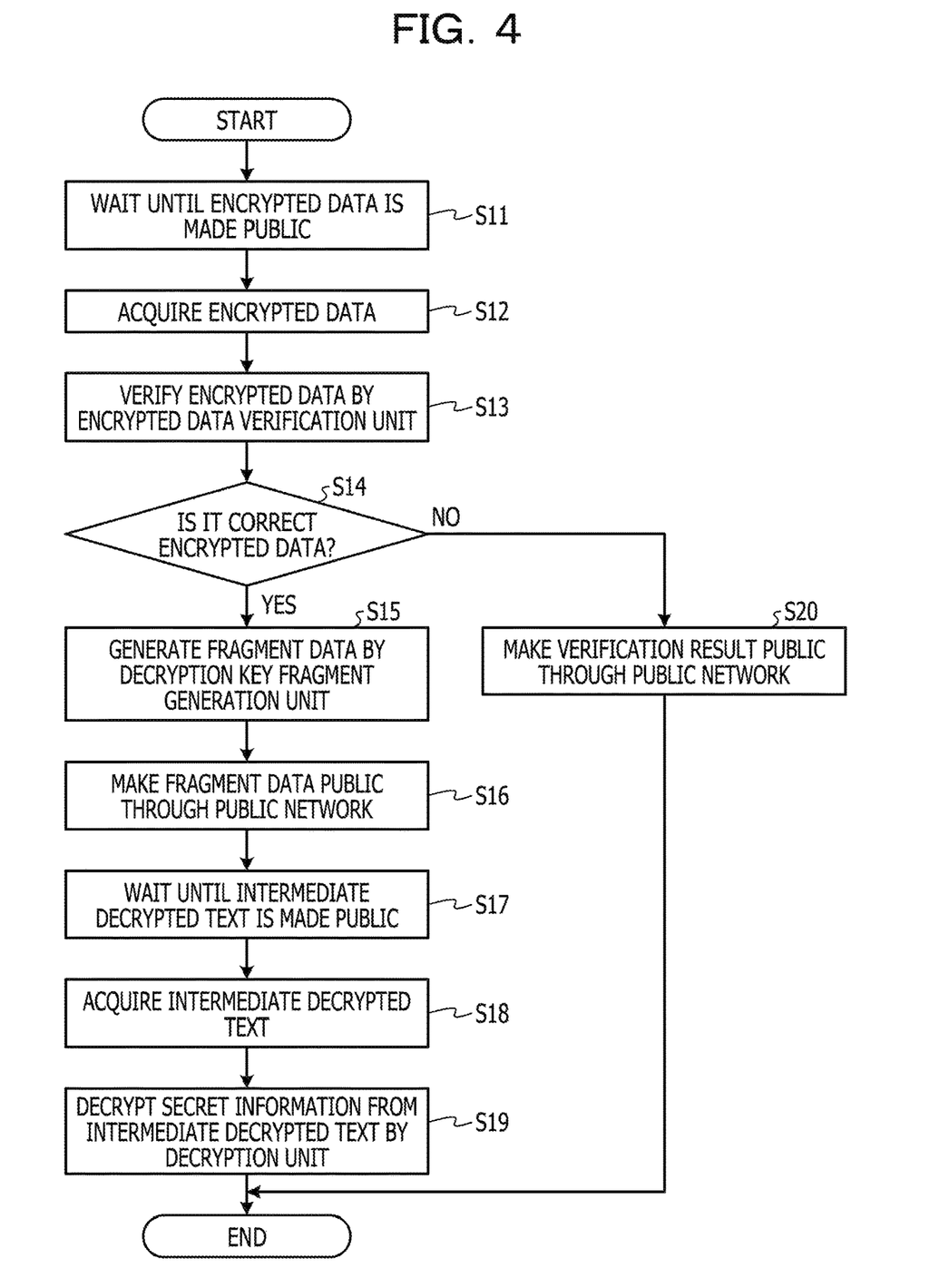
FIG. 4 is a flowchart illustrating a flow of processing by a party device.

Next, a flow of processing by the party device 3 will be described. FIG. 4 is a flowchart illustrating a flow of processing by the party device 3. As Illustrated in FIG. 4, the party device 3 waits until encrypted data is made public (step S11), and acquires the encrypted data when the encrypted data is made public (step S12).

The party device 3 verifies the encrypted data by the encrypted data verification unit 32 (step S13), and determines whether or not the acquired encrypted data is correct encrypted data (step S14). If the acquired encrypted data is correct encrypted data, the party device 3 generates fragment data by the decryption key fragment generation unit 33 (step S15), and makes the fragment data public through the public network 5 (step S16).

The party device 3 waits until an intermediate decrypted text is made public (step S17), acquires the intermediate decrypted text when the intermediate decrypted text is made public (step S18), and decrypts secret Information from the intermediate decrypted text by the decryption unit 35 when the party device has decryption authority (step S19).

On the other hand, if the acquired encrypted data is not correct encrypted data in step S14, the party device 3 makes the verification result public through the public network 5 (step S20).

As described above, since the party device 3 makes the fragment data public through the public network 5, the fragment combining device 4 may generate an intermediate decrypted text using the fragment data.

Figure 5:
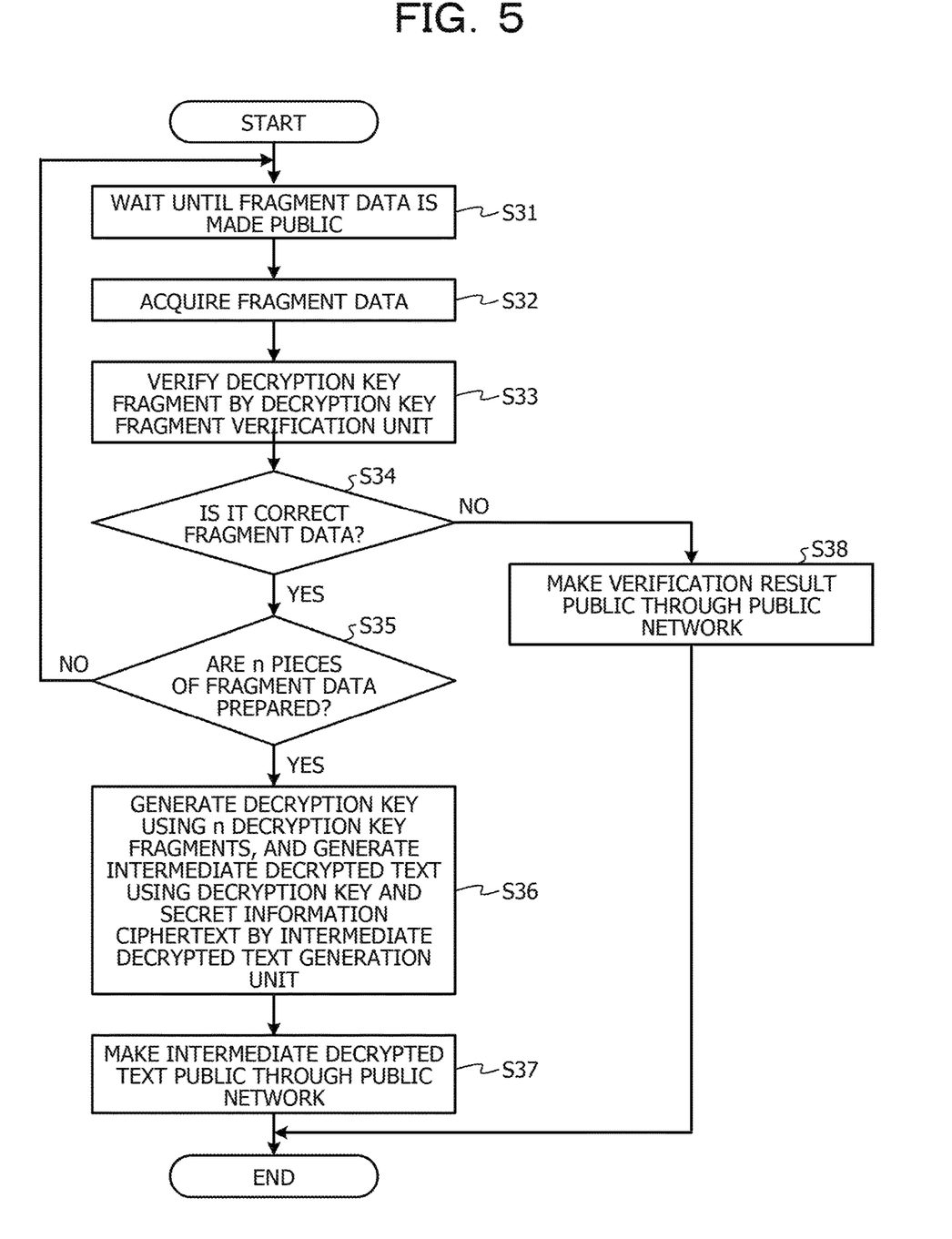
FIG. 5 is a flowchart illustrating a flow of processing by a fragment combining device.

Next, a flow of processing by the fragment combining device 4 will be described. FIG. 5 is a flowchart Illustrating a flow of processing by the fragment combining device 4. As illustrated in FIG. 5, the fragment combining device 4 waits until fragment data is made public (step S31), and acquires the fragment data when the fragment data is made public (step S32).

The fragment combining device 4 verifies the decryption key fragment by the decryption key fragment verification unit 42 (step S33), and determines whether or not the acquired fragment data is correct fragment data (step S34). If the acquired fragment data is correct fragment data, the fragment combining device 4 determines whether or not n pieces of fragment data are prepared (step S35). When the n pieces of fragment data are not prepared, the process returns to step S31.

On the other hand, when n pieces of fragment data are prepared, the intermediate decrypted text generation unit 43 of the fragment combining device 4 generates a decryption key using n decryption key fragments, and generates an intermediate decrypted text using the decryption key and a secret information ciphertext (step S36). The fragment combining device 4 makes the intermediate decrypted text public through the public network 5 (step S37).

On the other hand, if the acquired fragment data is not correct fragment data in step S34, the fragment combining device 4 makes the verification result public through the public network 5 (step S38).

As described above, since the fragment combining device 4 makes the intermediate decrypted text public through the public network 5, the party device 3 having decryption authority may decrypt the intermediate decrypted text to restore secret information.

As described above, in the first embodiment, the encrypted data generation device 2 generates a synthesis key using the public keys of the n party devices 3, and generates a secret information ciphertext using the synthesis key and the public keys of the u party devices 3 having decryption authority. The encrypted data generation device 2 generates a ciphertext signature and makes public encrypted data including the secret information ciphertext and the ciphertext signature. Each party device 3 verifies the validity of the encrypted data using the ciphertext signature, generates a decryption key fragment using the private key upon verifying the validity of the encrypted data, and generates a fragment signature related to the decryption key fragment. The party device 3 makes public fragment data including the decryption key fragment and the fragment signature. The fragment combining device 4 verifies the validity of the decryption key fragment using the fragment signature, generates a decryption key by combining the decryption key fragments upon verifying the validity of the decryption key fragment, and generates an intermediate decrypted text using the generated decryption key. The fragment combining device 4 makes the intermediate decrypted text public. The party device 3 having decryption authority decrypts the intermediate decrypted text by using the private key of the own device to restore secret information.

Therefore, the encryption processing system 1 may not use a highly reliable organization that generates a common key. Since only the party device 3 having decryption authority may restore secret information, the encryption processing system 1 may perform access control on the secret information. Since the encryption processing system 1 uses a key pair of a public key and a private key, the party device 3 has only to manage the private key, so that the amount of private data managed by the party device 3 may be reduced.

In the first embodiment, the encrypted data generation device 2 generates a synthesis key by performing multiplication of the public keys of the n party devices 3, and exponentiating the multiplication result by a first random number. The encrypted data generation device 2 generates a ciphertext signature using a second random number, and makes public the encrypted data including information on the two random numbers. Therefore, the encrypted data generation device 2 may make the synthesis key and the ciphertext signature random.

In the first embodiment, since the party device 3 generates a fragment signature using a third random number, and makes public the fragment signature including information of the third random number, the fragment signature may be made random.

In the first embodiment, since the fragment combining device 4 generates a decryption key by multiplication of decryption key fragments, the decryption key may be easily generated.

Second Embodiment

In the first embodiment, a description is given of a case where a decryption key is generated using all of the decryption key fragments of the n party devices 3, but the encryption processing system 1 may generate a decryption key using decryption key fragments of k ($1 \leq k < n$) party devices 3. In other words, for example, the encryption processing system 1 may generate a decryption key based on the (k, n) threshold scheme. In a second embodiment, an encryption processing system 1 that generates a decryption key using decryption key fragments of the k party devices 3 will be described. For convenience of explanation, a case where n=3, k=2, and u=2 will be described. Description of the same functional units as those in the first embodiment is omitted.

The synthesis key generation unit 22a of the encrypted data generation device 2 generates random numbers $t_{12}$, $t_{23}$, and $t_{13}$, which are elements of G, instead of t. The encryption unit 22b generates $\rho_{12}$, $\rho_{23}$, and $\rho_{13}$, which are elements of G, instead of $\rho$. Subscripts p and q in $t_{pq}$ and $\rho_{pq}$ respectively indicate the numbers of the party devices 3 from which decryption key fragments are to be collected. For example, $t_{12}$ is a random number used to generate a synthesis key when collecting decryption key fragments from the party device, and the party device$_2$.

The encryption unit 22b of the encrypted data generation device 2 generates the following $c_1$ to $c_3$, c, and a.

$$c_1 = g^{t_{12}} \quad (16)$$

$$c_2 = H_1(pp)^{t_{12}} \quad (17)$$

$$c_3 = E((pk_1 * pk_2)^{t_{12}}, m) \quad (18)$$

$$P_1 = g^{\rho_{12}}, P_2 = H_1(pp)^{\rho_{12}}, c = H_2(pp\|pk_1\|pk_2\|c_1\|c_2\|c_3\|P_1\|P_2) \quad (19)$$

$$\sigma = \rho_{12} + C * t_{12} \quad (20)$$

The encryption unit 22b changes the subscript 12, to 23 and 13, to generate three sets of encrypted data including $c_1$ to $c_3$, c, and $\sigma$. When the subscript is 23, the public keys used for the calculation of $c_3$ and c are $pk_2$ and $pk_3$, and when the subscript is 13, the public keys used for the calculation of $c_3$ and c are $pk_1$ and $pk_3$. A subscript is added to the encrypted data. In many cases, when a decryption key is generated using decryption key fragments of the k party devices 3 among the n party devices 3, the encryption unit 22b generates $_nC_k$ pieces of encrypted data.

The encrypted data verification unit 32 of the party device 3 verifies the encrypted data in which the number of the own device is included in the subscript. The encrypted data verification unit 32 may verify the encrypted data regardless of the subscript. For example, encrypted data using $pk_1$ and $pk_2$ may be verified by the party device$_3$.

The decryption key fragment generation unit 33 of the party device 3 generates a random number $r_{pq}$, which is an element of G, used for the fragment signature, and then generates fragment data including the following $K_i$, $d_i$, $s_i$.

$$K_i = c_1^{sk_i} \quad (21)$$

$$R_1 = g^{r_{pq}}, R_2 = c_1^{r_{pq}}, d_i = H_3(pp\|pk_1\|pk_2\|c_1\|c_2\|c_3\|\sigma\|pk_i\|K\|R_1\|R_2) \quad (22)$$

$$s_i = r_{pq} + d_i * sk_i \quad (23)$$

However, the decryption key fragment generation unit 33 generates fragment data only for encrypted data in which the number of the own device is Included in the subscript. In other words, for example, each party device 3 individually generates two pieces of fragment data. For example, the decryption key fragment generation unit 33 of the party device$_1$ generates fragment data for each of encrypted data with a subscript 12 and encrypted data with a subscript 13. In many cases, since the number of the numbers other than the number of the own device is n−1 and the number of digits other than the number of the own device in the subscript is k−1, the number of pieces of encrypted data in which the number of the own device is included in the subscript is $_{n-1}C_{k-1}$.

The intermediate decrypted text generation unit 43 of the fragment combining device 4 generates an intermediate decrypted text by using only two of the decryption key fragments made public by three party devices 3. For example, when generating an intermediate decrypted text from decryption key fragments generated by the party device$_2$ and the party device$_3$, the intermediate decrypted text generation unit 43 generates an intermediate decrypted text using, of two pieces of fragment data generated by the party device and the party device$_3$, the fragment data having a subscript of 23.

Figure 6:
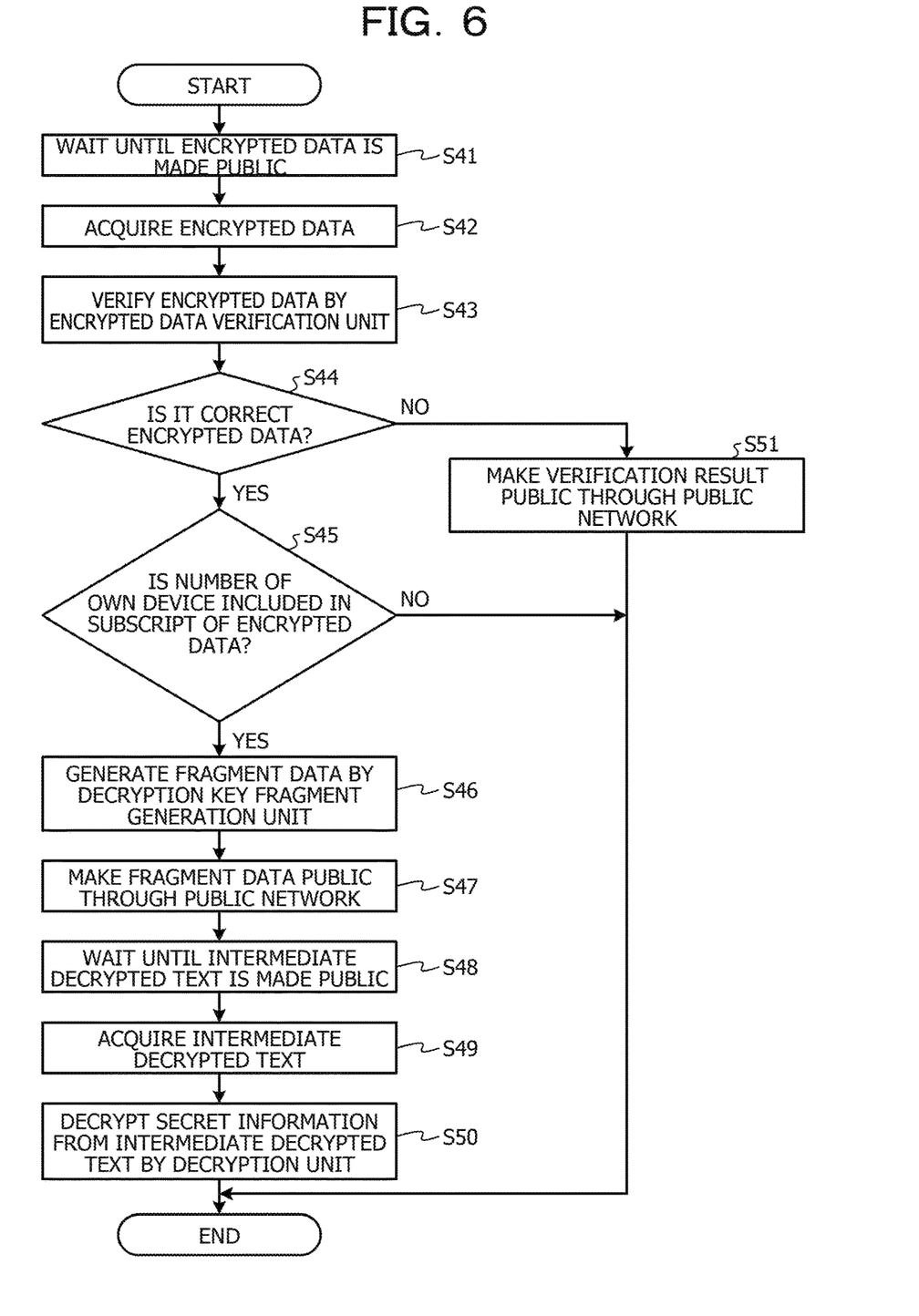
FIG. 6 is a flowchart illustrating a flow of processing by a party device according to a second embodiment.

Next, a flow of processing by the party device 3 according to the second embodiment will be described. FIG. 6 is a flowchart illustrating a flow of processing by the party device 3 according to the second embodiment. As Illustrated in FIG. 6, the party device 3 according to the second embodiment waits until encrypted data is made public (step S41), and acquires the encrypted data when the encrypted data is made public (step S42).

The party device 3 according to the second embodiment verifies the encrypted data by the encrypted data verification unit 32 (step S43), and determines whether or not the acquired encrypted data is correct encrypted data (step S44). If the acquired encrypted data is correct encrypted data, the party device 3 according to the second embodiment determines whether or not the number of the own device is included in the subscript of the encrypted data (step S45).

If the number of the own device is not included in the subscript of the encrypted data, the party device 3 according to the second embodiment ends the process. On the other hand, if the number of the own device is included in the subscript of the encrypted data, the party device 3 according to the second embodiment generates fragment data by the decryption key fragment generation unit 33 (step S46), and makes the fragment data public through the public network 5 (step S47).

The party device 3 according to the second embodiment waits until an intermediate decrypted text is made public (step S48), and acquires the Intermediate decrypted text when the intermediate decrypted text is made public (step S49). When the party device 3 according to the second embodiment has decryption authority, the decryption unit 35 decrypts secret information from the intermediate decrypted text (step S50).

On the other hand, if the acquired encrypted data is not correct encrypted data in step S44, the party device 3 according to the second embodiment makes the verification result public through the public network 5 (step S51).

As described above, since the party device 3 according to the second embodiment generates fragment data when the number of the own device is included in the subscript of the encrypted data, the fragment combining device 4 may generate an intermediate decrypted text using the fragment data.

Figure 7:
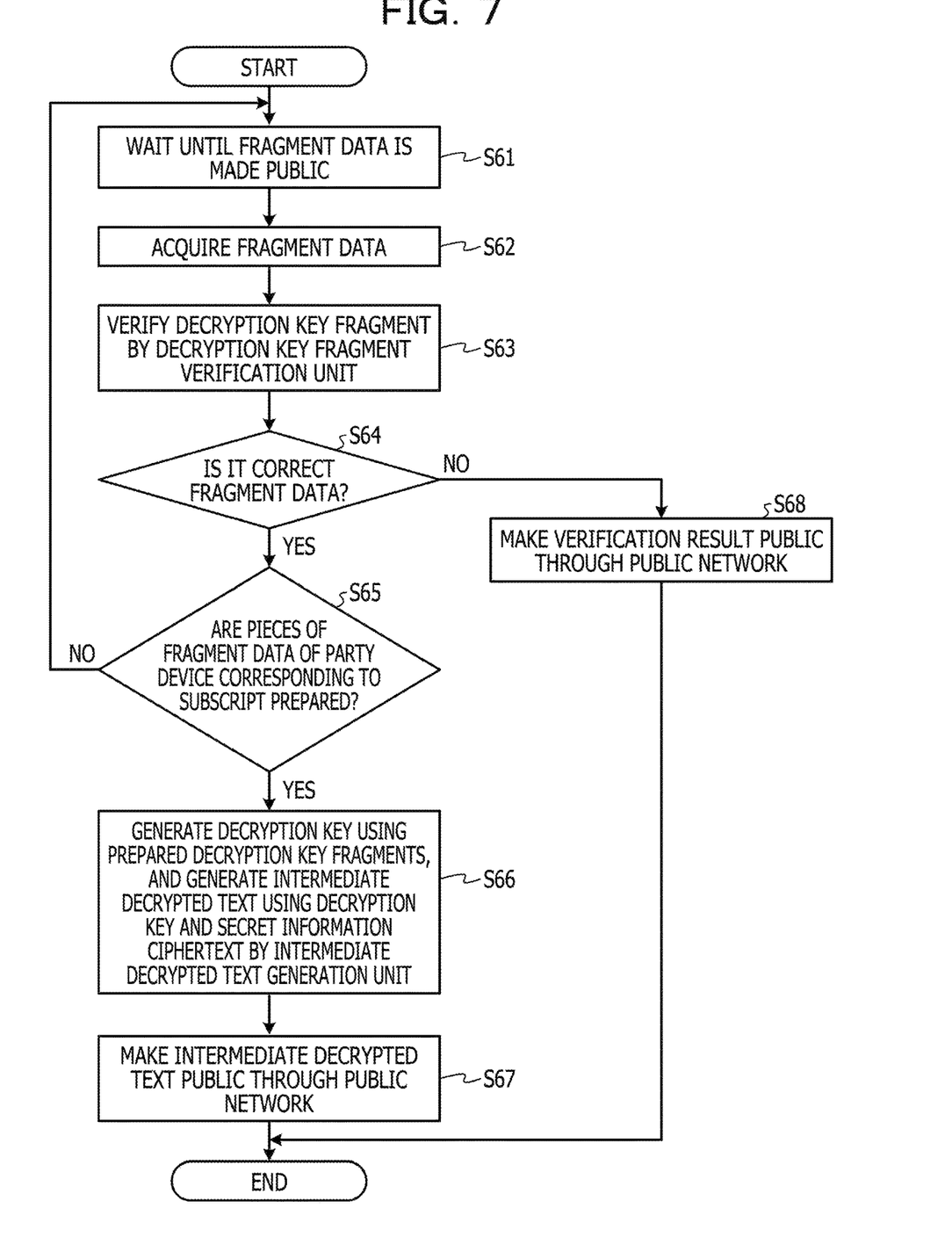
FIG. 7 is a flowchart illustrating a flow of processing by a fragment combining device according to the second embodiment.

Next, a flow of processing by the fragment combining device 4 according to the second embodiment will be described. FIG. 7 is a flowchart illustrating a flow of processing by the fragment combining device 4 according to the second embodiment. As illustrated in FIG. 7, the fragment combining device 4 according to the second embodiment waits until fragment data is made public (step S61), and acquires the fragment data when the fragment data is made public (step S62).

The fragment combining device 4 according to the second embodiment verifies the decryption key fragment by the decryption key fragment verification unit 42 (step S63), and determines whether or not the acquired fragment data is correct fragment data (step S64). If the acquired fragment data is correct fragment data, the fragment combining device 4 determines whether or not pieces of fragment data of the party device 3 corresponding to a subscript are prepared (step S65). When not prepared, the process returns to step S61.

On the other hand, when pieces of fragment data of the party device 3 corresponding to the subscript are prepared, the intermediate decrypted text generation unit 43 of the fragment combining device 4 according to the second embodiment generates a decryption key using the prepared decryption key fragments, and generates an intermediate decrypted text using the decryption key and a secret information ciphertext (step S66). The fragment combining device 4 according to the second embodiment makes the intermediate decrypted text public through the public network 5 (step S67).

On the other hand, if the acquired fragment data is not correct fragment data in step S64, the fragment combining device 4 according to the second embodiment makes the verification result public through the public network 5 (step S68).

As described above, since the fragment combining device 4 according to the second embodiment generates an intermediate decrypted text when pieces of fragment data of the party device 3 corresponding to the subscript is prepared, the party device 3 having decryption authority may decrypt the intermediate decrypted text to restore secret information.

As described above, in the second embodiment, the synthesis key generation unit 22a generates $_nC_k$ synthesis keys using the public keys of the k party devices 3, and the encryption unit 22b generates $_nC_k$ pieces of encrypted data by adding subscripts representing the k party devices 3 using the $_nC_k$ synthesis keys. The decryption key fragment generation unit 33 generates $_{N-1}C_{k-1}$ pieces of fragment data by adding subscripts using the private key of the own device. The intermediate decrypted text generation unit 43 generates a decryption key from k pieces of fragment data corresponding to one subscript, and generates an intermediate decrypted text using the generated decryption key. Therefore, the encryption processing system 1 may restore secret information using k decryption key fragments.

In the first and second embodiments, the encrypted data generation device 2, the party device 3, and the fragment combining device 4 have been described. However, by realizing the configurations of the encrypted data generation device 2, the party device 3, and the fragment combining device 4 with software, an encrypted data generation program, a party program, and a fragment combining program having similar functions may be obtained, respectively. A computer (information processing apparatus) for executing the encrypted data generation program will now be described. The party program and the fragment combining program are executed by similar computers.

Figure 8:
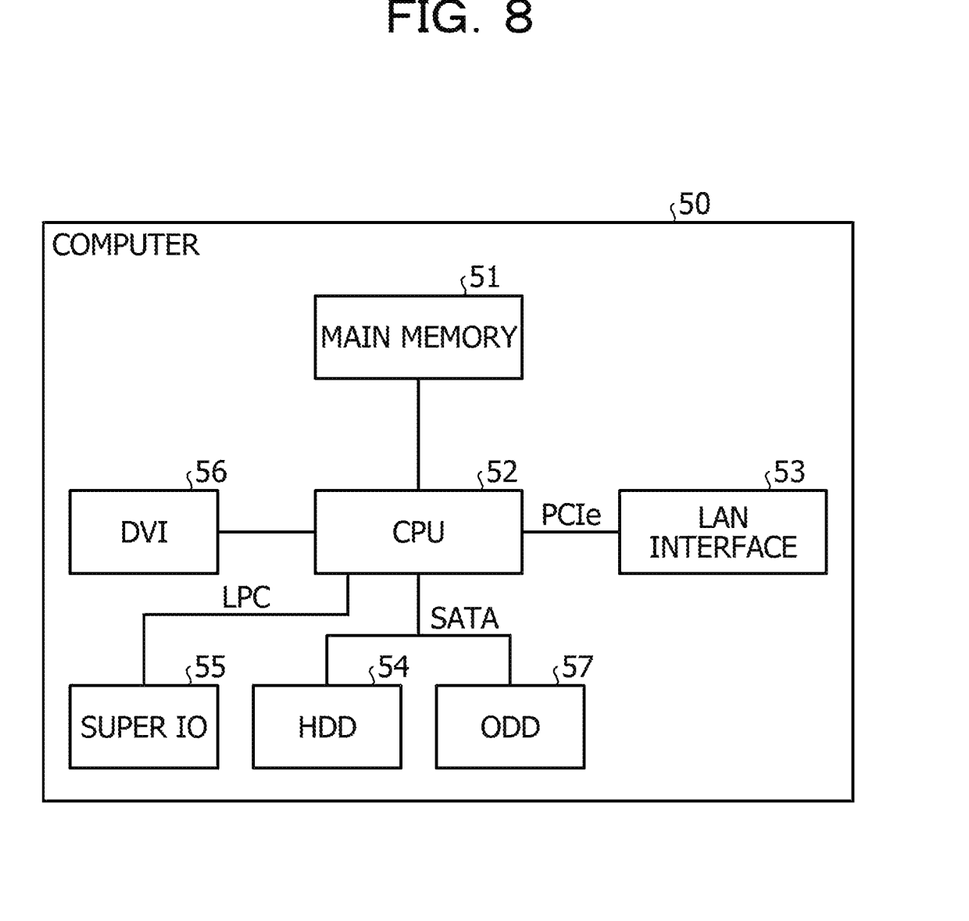
FIG. 8 is a diagram illustrating a hardware configuration of a computer for executing an encrypted data generation program according to the first and second embodiments.

FIG. 8 is a diagram illustrating a hardware configuration of a computer for executing an encrypted data generation program according to the first and second embodiments. As illustrated in FIG. 8, a computer 50 includes a main memory 51, a central processing unit (CPU) 52, a local area network (LAN) interface 53, and a hard disk drive (HDD) 54. The computer 50 further includes a super input output (IO) 55, a digital visual interface (DVI) 56, and an optical disk drive (ODD) 57.

The main memory 51 is a memory for storing a program, halfway results of program execution, and the like. The CPU 52 is a central processing unit for reading the program from the main memory 51 and executing the program. The CPU 52 includes a chipset including a memory controller.

The LAN interface 53 is an interface for coupling the computer 50 to another computer through the LAN. The HDD 54 is a disk device for storing a program and data, and the super IO 55 is an interface for coupling input devices such as a mouse or a keyboard. The DVI 56 is an interface for coupling a liquid crystal display device, and the ODD 57 is a device for reading and writing of a digital versatile disc (DVD).

The LAN interface 53 is coupled to the CPU 52 by way of Peripheral Component Interconnect Express (PCIe), and the HDD 54 and the ODD 57 are coupled to the CPU 52 by way of Serial Advanced Technology Attachment (SATA). The super IO 55 is coupled to the CPU 52 by way of low pin count (LPC).

The encrypted data generation program executed in the computer 50 is stored in a DVD which is an example of a recording medium capable of being read by the computer 50, is read from the DVD by the ODD 57, and is installed in the computer 50. Alternatively, the encrypted data generation program is stored in a database or the like of another computer system coupled through the LAN Interface 53, is read from the database or the like, and is Installed in the computer 50. The encrypted data generation program thus installed is stored in the HDD 54, is read to the main memory 51, and is executed by the CPU 52.

According to an aspect of the embodiments, the present embodiments enable non-use of a highly reliable organization that generates a common key when a key is shared and managed.

All examples and conditional language provided herein are intended for the pedagogical purposes of aiding the reader in understanding the invention and the concepts contributed by the Inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encryption processing system, comprising:
a first device configured to encrypt secret information;
second devices of a first number, the second devices each including a key pair of a public key and a private key; and
a third device configured to collect and combine pieces of fragment information shared by the second devices of the first number,
wherein
the first device includes:
a first memory; and
a first processor coupled to the first memory and the first processor configured to:
generate synthesis keys of a third number by performing, a third number of times, a process for selecting public keys of a second number to be used for key restoration from public keys of the first number to generate the synthesis key, the third number being a number of combinations of selecting the public keys of the second number from the public keys of the first number;

generate an intermediate text from confidential texts of a fourth number generated by encrypting each piece of the secret information by using the public keys of the second devices of the fourth number having decryption authority for the secret information among the second devices of the first number;

generate secret information ciphertexts of the third number by further encrypting the intermediate text using each of the synthesis keys; and make public encrypted data including the secret information ciphertexts of the third number and a first signature relating to the secret information ciphertexts of the third number, each of the second devices includes:

a second memory; and a second processor coupled to the second memory and the second processor configured to:

verify validity of the encrypted data by using the first signature;

generate, when the validity has been verified, by using a private key included in an own second device, decryption key fragments of a fifth number, the fifth number being a number of combinations of selecting the second devices of a number obtained by subtracting one from the second number from among the second devices of a number obtained by subtracting one from the first number;

generate second signatures of the fifth number respectively corresponding to the decryption key fragments of the fifth number; and make public the decryption key fragments of the fifth number and the corresponding second signatures, the third device includes:

a third memory; and a third processor coupled to the third memory and the third processor configured to:

verify validity of the decryption key fragments of the fifth number by using the decryption key fragments of the fifth number and the corresponding second signatures;

generate a decryption key by combining decryption key fragments of the second number corresponding to any one of the secret information ciphertexts of the third number among the decryption key fragments of the fifth number that are made public by each of the second devices of the first number;

generate the intermediate text by decrypting the secret information ciphertext corresponding to the generated decryption key with the generated decryption key; and make public the intermediate text generated by the third processor, and the second processor is further configured to:

decrypt, when the own second device has the decryption authority, the intermediate text that is made public by the third processor using the private key included in the own second device; and restore the secret information.

2. The encryption processing system according to claim 1, wherein the first number and the second number are the same, and the third number and the fifth number are one.

3. The encryption processing system according to claim 1, wherein the first processor is further configured to:

generate the synthesis key by performing multiplication of the public keys of the second number, and exponentiating a multiplication result by a first random number;

generate the first signature by using a second random number; and make public the encrypted data by further including information on the first random number and information on the second random number, the second processor is further configured to:

verify validity of the encrypted data by further using the information on the first random number and the information on the second random number, and the third processor is further configured to:

generate the decryption key by multiplication of the decryption key fragments of the second number.

4. The encryption processing system according to claim 1, wherein the second processor is further configured to:

generate the second signatures by using a third random number; and make public the second signatures by including information on the third random number, and the third processor is further configured to:

verify validity of the decryption key fragments of the fifth number by further using the information on the third random number.

5. An encryption processing method, comprising:

generating, by a first computer, synthesis keys of a third number by performing, a third number of times, a process for selecting public keys of a second number to be used for key restoration from public keys of a first number to generate the synthesis key, the third number being a number of combinations of selecting the public keys of the second number from the public keys of the first number;

generating, by the first computer, an intermediate text from confidential texts of a fourth number generated by encrypting each piece of secret information by using the public keys of second computers of the fourth number having decryption authority for the secret information among the second computers of the first number;

generating, by the first computer, secret information ciphertexts of the third number by further encrypting the intermediate text using each of the synthesis keys;

making public, by the first computer, encrypted data including the secret Information ciphertexts of the third number and a first signature relating to the secret information ciphertexts of the third number;

verifying, by each of second computers, validity of the encrypted data by using the first signature, the second computers each including a key pair of a public key and a private key;

generating by each of the second computers, when the validity has been verified, by using a private key included in an own second computer, decryption key fragments of a fifth number, the fifth number being a number of combinations of selecting the second computers of a number obtained by subtracting one from the second number from among the second computers of a number obtained by subtracting one from the first number;

generating, by each of the second computers, second signatures of the fifth number respectively corresponding to the decryption key fragments of the fifth number;

making public, by each of the second computers, the decryption key fragments of the fifth number and the corresponding second signatures;

verifying, by a, validity of the decryption key fragments of the fifth number by using the decryption key fragments of the fifth number and the corresponding second signatures;

generating, by the third computer, a decryption key by combining decryption key fragments of the second number corresponding to any one of the secret information ciphertexts of the third number among the decryption key fragments of the fifth number that are made public by each of the second computers of the first number;

generating, by the third computer, the intermediate text by decrypting the secret information ciphertext corresponding to the generated decryption key with the generated decryption key;

making public, by the third computer, the intermediate text generated by the first computer;

decrypting, by each of the second computers of the fourth number having decryption authority for the secret information, the intermediate text that is made public by the third computer using the private key Included in the own second computer; and restoring the secret information by the second computers of the fourth number having decryption authority for the secret information.

6. The encryption processing method according to claim 5, wherein
the first number and the second number are the same, and the third number and the fifth number are one.

7. The encryption processing method according to claim 5, further comprising:

generating, by the first computer, the synthesis key by performing multiplication of the public keys of the second number and exponentiating a multiplication result by a first random number;

generating, by the first computer, the first signature by using a second random number;

making public, by the first computer, the encrypted data by further including information on the first random number and information on the second random number;

verifying, by each of the second computers, validity of the encrypted data by further using the information on the first random number and the information on the second random number; and generating, by the third computer, the decryption key by multiplication of the decryption key fragments of the second number.

8. The encryption processing method according to claim 5, further comprising:

generating, by each of the second computers, the second signatures by using a third random number;

making public, by each of the second computers, the second signatures by including Information on the third random number; and verifying, by the third computer, validity of the decryption key fragments of the fifth number by further using the information on the third random number.

9. A non-transitory computer-readable recording medium having stored therein a program that causes computers to execute a process, the process comprising:

acquiring fragment data transmitted over a public network from a plurality of different devices communicating over the public network and having decryption authority for secret information being communicated between the plurality of different devices;

generating a decryption key by multiplication of the acquired fragment data;

verifying the generated decryption key based on validity of each of the acquired fragment data;

outputting intermediate decryption text generated by using the decryption key and encrypted data including secret information to the public network for the plurality of different devices to communicate the secret information;

acquiring, from the public network, public keys provided by each of the plurality of the different devices;

generating a first random number for encryption and a second random number for a signature;

generating a synthesis key using the public keys and the first random number;

generating the encrypted data, the signature and random number information; and outputting the generated encrypted data to the public network.

10. The non-transitory computer-readable recording medium according to claim 9, the process further comprising:

outputting a verification result to the public network indicating the acquired fragment data is not correct to the public network when each acquired fragment data is not valid.

11. The non-transitory computer-readable recording medium according to claim 9, the process further comprising:

acquiring, with at least one of the plurality of different devices, the output encrypted data;

verifying the encrypted data;

generating fragment data corresponding to the at least one of the plurality of different devices when the encrypted data is verified;

outputting, with at least one of the plurality of different device, the generated fragment data to the public network;

waiting for the intermediate decryption text to be available on the public network;

acquiring the intermediate decryption text from the public network; and decrypting the secret information from the intermediate decryption text.

* * * * *